Dec. 3, 1963
R. G. CALL
3,112,497
WATER CONSERVATION SYSTEM
Filed July 31, 1962
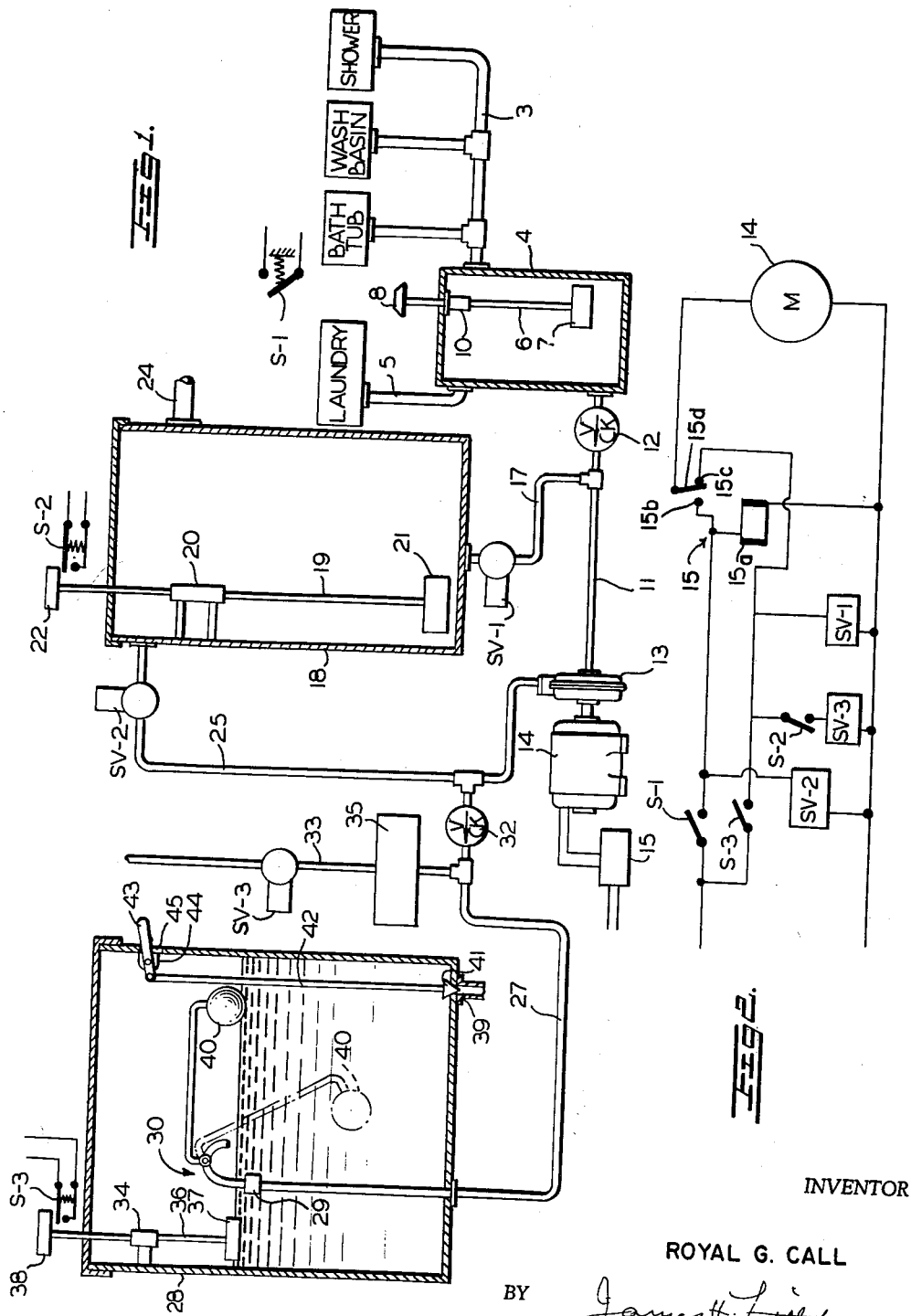
INVENTOR
ROYAL G. CALL
BY James H. Littlepage
ATTORNEY _United States Patent Office_

3,112,497
Patented Dec. 3, 1963

3,112,497
WATER CONSERVATION SYSTEM
Royal G. Call, 20 N. Orchard, Boise, Idaho
Filed July 31, 1962, Ser. No. 213,818
9 Claims. (Cl. 4—1)

This invention relates to a water conserving system, and, more particularly, to a system for using the same water for at least two separate purposes before it is disposed to a sewer or other waste outlet.

The specific embodiment disclosed herein sets forth my water conservation system as it might be utilized in a household plumbing circuit, although it is to be understood that the system is applicable to other environments. Basically the system comprises means for passing once-used water from any or all of such household plumbing fixtures as a bath tub, shower, washbasin and laundry facility by means of gravity flow into a relatively small receiver tank from which tank the used water is further distributed, by instrumentalities to be described, to a relatively large storage tank. The used water thus directed to the storage tank is then made available as required to the flush tank of a toilet where it is re-used for flushing the toilet. In the event that insufficient used water is available in the storage tank to properly flush the toilet, other instrumentalities are provided to channel fresh water from the household's main incoming water line to the flush tank whereby such fresh water alone or in combination with some used water is made available for flushing the toilet.

The particular system disclosed is equally usable in households having basements or in households where no basement is found. Also, it is of no consequence, with the system illustrated, whether the toilet flush tank being furnished with flushing water is located above or below the large storage tank.

One object of the invention is to provide a system for conserving water by using a given portion of household water, which enters the household as fresh water, a plurality of times for different purposes before it is discharged to the sewer.

Another object of the invention is to provide means whereby once-used water discharging from certain plumbing fixtures may be used a second time by another plumbing fixture.

Another object is to reduce overall water use, and, thereby, costs by re-using at least a portion of the incoming fresh water being supplied a household or the like. (Throughout this specification and in the claims the term "household" is meant to apply not only to private homes, but also to apartments, offices and, in fact, any human habitat or construction wherein a system of the type shown would be applicable.)

A yet further object of the invention is to prevent used water from entering and possibly contaminating a household's fresh water supply. This is accomplished by providing an air lock in the system as will be described.

Another object is to provide means for storing a substantial quantity of used water for toilet flushing purposes. Used water throughout this specification and claims is defined as water which was potable, i.e., "fresh," when it entered the household, but which, due to human direction and use, has subsequently been caused to pass through a plumbing fixture, such as a washbasin, shower, laundry facility or bath tub (or the like), such passage at least subjecting the originally "fresh" water to possible contamination if not actually contaminating same.

Other objects will be apparent from the remainder of the specification and from the drawings.

In the drawings which form a part of this specification:
FIGURE 1 is a schematic showing not to scale of my novel water conservation system, and FIGURE 2 illustrates the electrical circuitry which forms a part of and is required to energize and operate the system of FIGURE 1.

Referring now to FIGURE 1 of the drawings, a plurality of plumbing fixtures, namely, a shower, wash basin and bath tub, are shown connected to a common drain line 3 which discharges used water from the aforementioned fixtures into a relatively small receiver tank 4. The tank 4 is located sufficiently lower than the tub, basin, and shower outlets that used or waste water from these fixtures flows by gravity into tank 4. Also connected to tank 4 by means of drain line 5 is a laundry facility such as a clothes or dish washer which also discharges its used water to tank 4 by gravity flow.

The top of tank 4 is provided with an aperture through which passes a vertically extending movable float rod 6. To the bottom end of rod 6 is fixedly attached a buoyant float 7, and to the top end of rod 6 is attached a switch-actuating camming plate 8 which is adapted to contact and cam close the normally biased-open movable contact of a switch S–1 located there-above. It will be noted that, due to the construction of the movable switch blade and the plate 8, the float 7 (and elements 6 and 8 connected thereto) may rise slightly after causing the initial closing of switch S–1 without altering the closed condition of switch S–1. Fixed to and depending from the top of tank 4, and coaxial with the aperture therein is a tubular guide 10 in which rod 6 is located. Guide 10 constrains rod 6 to substantially vertical movement as it moves in response to the level of the water in tank 4 acting on float 7.

Communicating with the interior of tank 4 near the bottom thereof is one end of a conduit 11 in which is located a check valve 12 designed to pass fluid only in the direction indicated by the arrow. The other end of conduit 11 communicates with and forms the fluid inlet for a pump 13 which is adapted to be driven by an electric motor 14 when the motor is energized by a motor relay designated generally as 15. Relay 15 (see FIGURE 2), more particularly, includes a coil 15a, two contacts 15b and 15c and an armature 15d. Armature 15d normally engages contact 15c, but moves out of engagement with 15c and into circuit-making contact with 15b upon energization of coil 15a. Coil 15a is energized whenever switch S–1 is closed. Used water passes from tank 4 to pump 13 by gravity flow.

Communicating with conduit 11 downstream of check valve 12 is a branch line 17 which communicates with the lower end of a relatively large storage tank 18. Interposed between conduit 11 and tank 18 in line 17 is a first normally closed conventional solenoid-actuated valve designated SV–1.

Located in the top of tank 18 is an aperture through which passes a vertically oriented movable float-rod 19. A tubular guide 20 attached to the side wall of tank 18 surrounds rod 19 and insures vertical travel of the rod. To the bottom of rod 19 is rigidly affixed a buoyant float 21 and to the top of rod 19 is rigidly affixed a switch-actuating plate 22 which is adapted, when float 21 descends substantially to the bottom of tank 18, to contact and close a normally biased open switch S–2 located between plate 22 and top of tank 18.

Communicating with tank 18 near the top thereof is a pipe 24 which leads to the sewer and is necessary in case more used water enters tank 18 than is required in flushing the toilet. Also communicating with the top of tank 18, somewhat above the level at which pipe 24 is joined to tank 18, is one end of a conduit 25 the opposite end of which forms the outlet for pump 13. Interposed in conduit 25 near the tank-connected end thereof is a second normally closed conventional solenoid-actuated valve designated SV–2.

Branching off from conduit 25 between pump 13 and valve SV-2 is one end of a pipe 27. The other end of pipe 27 extends upwardly through an aperture in the bottom of a conventional toilet flush tank 28 and connects at its top end by means of a coupling 29 to a conventional float-controlled, downwardly discharging fill valve assembly, designated generally as 30. Assembly 30 includes a valve (not shown) which is designed to pass flushing water into the tank when a float 40, which is a part of assembly 30 and is attached to the valve thereof, moves to the dotted line position shown, and to prohibit such water flow when the float 40 is in the solid line position. Interposed in pipe 27 near the point where it branches off from conduit 25 is a check valve 32 which allows flow only in the direction indicated by the arrow.

Communicating with line 27 immediately down-stream from check valve 32 is one end of a conduit 33 which connects at its opposite end (not shown) to the main "fresh" water supply line of the household, or the like, in which my system is installed. Interposed in conduit 33 near the point where conduit 33 joins line 27 is a conventional air lock 35, and also interposed in conduit 33, but farther from the point where pipes 27 and 33 join than air lock 35, is a third normally closed conventional solenoid-actuated valve SV-3.

Located within toilet tank 28 and affixed to one side wall thereof is tubular guide 34 in which is located a vertically movable rod 36. To the bottom end of rod 36 is fixedly attached a buoyant float 37 and to the top end of the rod 36 is fixedly attached a switch-actuating plate 38 which is adapted to contact and close a normally biased open switch S-3 located between plate 38 and the top of tank 28 when float 37 descends slightly below the position in which it is shown. Switch S-3 also serves as a stop to prevent float 37 from descending any lower than that level at which it closes S-3. (Switch S-1, similarly, but reversely, could be modified to serve as a stop for float 7 if desired. In such a modification, the camming action between elements 8 and switch S-1 would be unnecessary.)

Communicating with the interior of flush tank 28 at the bottom thereof is a flush pipe 39 through which flushing water passes to the toilet bowl (not shown). To prevent flushing water from flowing through pipe 39 except when desired by a user, a conventional manually-operated slow-closing flush valve 41 is provided which normally closes the inlet to pipe 39. Valve 41 is fixedly attached to the bottom end of an elongated stem 42 which stem at its top end is pivotally attached to one end of a hand lever 43. Lever 43 is pivotally attached near its center to a bracket 44 which is rigidly attached to and extends inwardly from a side wall of the tank 28, and the free end of the lever extends out through an aperture 45 in such side wall whereby it may be manually depressed to lift valve 41 thereby allowing flushing water to flow from tank 28 into line 39.

FIGURE 2 sets forth the electrical relationship between the switches S-1, S-2 and S-3; the solenoid-actuated valves SV-1, SV-2, and SV-3, the motor-actuating relay 15 and the motor 14 seen in FIGURE 1, and the description of the operation of my system to follow hereinafter will clearly set forth how the electrical components of the system cooperate with the other elements enumerated hereinabove in order to achieve the objects listed at the beginning of this specification. It is pointed out that the switches in both FIGURES 1 and 2 are in the same condition, i.e., each switch is shown open in both figures.

OPERATION

My system is designed to conserve water by using the same water a plurality of times in the following fashion:

Let it be assumed that a person has employed one or more of the plumbing fixtures denoted laundry, bath tub, wash basin and/or shower in the conventional manner, i.e., by drawing "fresh" water into the fixture through the usual inlet (not shown) from the main supply main (not shown) and after use allowing such water, previously "fresh," but now used, to drain from the fixture. In my system instead of draining directly to the sewer, the used water from any of the fixtures denoted drains by gravity flow to the receiver tank 4 either via drain line 3 or drain line 5. (The separate drain lines 3 and 5 are shown to illustrate that the various plumbing fixtures denoted as draining to tank 4 need not be grouped together, but can be conveniently located at widely separated locations and levels relative to the receiver tank 4 without altering the operation of my system. The only criteria which dictates placement of such fixtures relative to tank 4 is that they be positioned so that they will drain by gravity flow into tank 4.) Drainage of the used water into receiver tank 4 causes tank 4 to fill whereupon float 7 rises carrying with it rod 6 and switch-actuating plate 8. When tank 4 has nearly filled, plate 8 has moved upwardly to the point where it cammingly engages the movable contact of switch S-1, thereby closing switch S-1. Referring to FIGURE 2, it will be noted that closure of switch S-1 simultaneously causes normally closed solenoid valve SV-2 to open (thus establishing a flow path between pump 13 and storage tank 18 through conduit 25) and motor 14 (in parallel with SV-2) to be energized whereby pump 13 is actuated. Motor 14 is energized because closure of switch S-1 energizes the coil 15a of relay 15 which causes armature 15d to swing into circuit-making contact with contact 15b. Pump 13 thereupon draws in used water from the receiver tank 4 (by way of conduit 11 and through check valve 12) and forces the incoming water out into conduit 25, through now-open valve SV-2 and into the storage tank 18. In the event that tank 18 should receive more once-used water from the pump 13 than is required for toilet-flushing purposes, such excess water flows harmlessly through pipe 24 to the sewer (not shown).

During the just-described operation of pump 13 used water may under certain circumstances (to be described) enter tank 28, but used water cannot enter and possibly contaminate the fresh water in that portion of conduit 33 which interconnects valve SV-3 and the main fresh water supply (not shown), first, because valve SV-3 is closed, and, second, because of conventional air lock 35 which, as used water attempts to flow from pipe 27 toward valve SV-3, establishes an air pressure acting against the used water coming into conduit 33 equal in force but opposite in direction to the pressure of such incoming used water.

Should flush tank 28 be empty, or nearly empty, when pump 13 is actuated as a result of the closure of switch S-1 (a condition that could occur as a result of the faulty operation of float 37 or switch S-3 as will be subsequently seen), used water would not only enter conduit 25 and conduit 33 (as far as the air lock 35) but would also enter and flow through pipe 27 and fill valve assembly 30 thereby discharging used water into tank 28. The reason that flow through pipe 27 and assembly 30 would be possible under the stated condition is because, when tank 28 is empty, or nearly so, float 40 is at or near the dotted line position seen in FIGURE 1 and the valve of assembly 30 which is controlled by float 40 is open. A short operation of pump 13 under such a condition (i.e., wherein tank 28 is initially empty), however, will soon cause enough used water to pass into tank 28 to raise float 40 to a level where it will close the valve of assembly 30 thereby forcing all subsequent output from pump 13 to flow through conduit 25 into tank 18 until switch S-1 is biased opened due to the descent of plate 8 caused by the descent of float 7 in tank 4. If tank 28 is full when pump 13 is activated as aforesaid, float 40 will be in the full line position shown and the valve of assembly 30 will be closed thereby preventing any used water from entering tank 28 at this juncture.

Let it now be assumed that no part of the system is being activated but that tank 18 and tank 28 are as full as possible (considering the uppermost position of float 40 and the location of pipe 24). Under these conditions should a user have need to flush the toilet bowl (not shown), by passing flushing water from tank 28 downwardly through pipe 39 to the bowl, such flushing would be initiated, as is conventional, by the user manually depressing the free end of lever 43. This action on the part of the user would open valve 41 allowing flushing water to flow through pipe 39 to flush the bowl. As water is discharged from tank 28 floats 40 and 37 concurrently descend with the descending water level.

The lowering of float 37 soon causes plate 38 to close switch S-3 which (see FIGURE 2) immediately causes valve SV-1 in circuit therewith to open thereby allowing replacement flushing water to flow from tank 18 through line 17 and then conduit 11 to the inlet of pump 13. Simultaneously the motor 14, in circuit with switch S-3 is energized thus driving pump 13 which attempts to force the replacement flushing water, being received from conduit 11, into conduit 25 thence into pipe 27, through check valve 32 and thence into emptying tank 28. (Note that valve SV-2 is closed at this time to prevent used water from merely recirculating from the bottom of tank 18, through line 17, conduit 11, pump 13, and conduit 25 back to the top of tank 18.) However, such flow from the pump 13 to tank 28 is not possible until float 40 descends sufficiently to open the valve in assembly 30. With rapid discharge of the flushing water from tank 28 through pipe 39, however, float 40 soon descends enough to open the valve in assembly 30 and replacement flushing water is forced into tank 28 from pump 13. Pump 13 will thus continue to fill tank 28 until such time (after the user has released the flushing lever 43 and valve 41 has again closed off pipe 39) that float 37 is again raised upwardly to the point where switch S-3 opens. (At this juncture float 40 will also again be raised to its full line position and the valve in assembly 30 will be closed.) The tank 28 now contains sufficient used water for a subsequent bowl flushing operation which if initiated, as described heretofore, would cause the same sequence of events to be repeated as long as tank 18 contains sufficient used water to supply the demands of tank 28.

In the event that a user should actuate the flush lever 43 when there is not sufficient used water in tank 18 to refill tank 28, then the following sequence of events would ensue. Actuation of lever 43 would unseat valve 41 causing flush water to flow through pipe 39 to the toilet bowl and, simultaneously, floats 37 and 40 would descend as described. Lowering of float 37 would again close switch S-3, open valve SV-1, and start pump 13 thereby drawing whatever remaining used water there might be available from tank 18 and forcing same to tank 28. Assuming that there was, at the time of the actuation of lever 43, only half-enough used water in tank 18 to properly refill tank 28, then it will be seen that when tank 18 is devoided of used water float 21 will have descended to a point where plate 22 will have closed switch S-2. Closure of S-2 causes valve SV-3 to open causing "fresh" water from the household's main water supply (under main line pressure) to flow through conduit 33, and air lock 35, and then through pipe 27 and assembly 30 into tank 28 thereby supplying the other half of the replacement water needed to re-fill tank 28 to the point where floats 37 and 40, respectively, terminate pump operation and close valve SV-1, and close the valve in assembly 30. Switch S-2 and valve SV-3, under such conditions, will remain actuated until enough used water is eventually received from tank 4 to lift float 21 sufficiently to open switch S-2.

It is to be understood that various changes might be made in the illustrated embodiment without departing from the spirit thereof. For example, other fluid level responsive switch actuation means might be substituted for the float-type actuators described herein.

Having now set forth and described one illustrative embodiment of my invention, what I claim as new and desire to secure by Letters Patent is:

1. In combination: a first plumbing fixture having a fresh water inlet and a used water drain operatively associated therewith; a first tank having an inlet and an outlet, said inlet on said tank being located at a lower level than said drain of said fixture and said outlet of said tank being located at a lower level than said inlet of said tank; first conduit means joining said drain to the inlet of said tank; a pump having an inlet and an outlet; second conduit means joining the outlet of said tank to the inlet of said pump; a second tank having an inlet and an outlet, said outlet on said second tank being located at a lower level than inlet of said second tank; third conduit means joining the outlet of said pump to the inlet of said second tank; fourth conduit means joining said outlet of said second tank to said second conduit means; a toilet flush-tank having an outlet at the bottom thereof and having a fluid level responsive fill-valve assembly located interiorly thereof; fifth conduit means joining said third conduit means to said fill-valve assembly; manually operable valve means associated with said flush-tank for controlling flow through the outlet of said flush tank; a first normally open switch; first level-responsive means in said first tank for closing said first switch when fluid in said first tank rises to a predetermined level; a second normally open switch; second level responsive means in said second tank for closing said third switch when fluid in said flush tank falls to a predetermined level; a third normally open switch; third level-responsive means in said flush tank for closing said third switch when fluid in said flush tank falls to a predetermned level, said valve of said fill valve assembly being opened when said fluid in said flush-tank falls to said predetermined level; a first normally closed electrically actuated valve interposed in said third conduit means; a second normally closed electrically actuated valve interposed in said fourth conduit means; sixth conduit means joining said fifth conduit means to a source of fresh water; a third normally open electrically operated valve means in said sixth conduit; an electric motor drivingly connected to said pump; a normally open relay electrically connected to said motor; and electrical circuit means joining a source of electrical power to said first, second and third switches, said first, second and third valves, said motor and said relay whereby: closure of said first switch only causes said second valve to open and said motor to drive said pump to draw used water from said first tank and discharge said used water to said second tank; closure of said third switch only causes said second valve to open and said relay to energize said motor to drive said pump so as to draw used water from said second tank and pass same to said flush tank; and concurrent closure of said second and third switches causes said second and third valves to open and said pump to be driven by means of said relay and motor so that fresh water from said source is made available to said fifth conduit to supplement the used water being drawn from said second tank and passed to said flush tank.

2. The combination of claim 1 including means in said sixth conduit means, between said third valve and said fifth conduit means, for preventing used water from mixing with said fresh water in the portion of said sixth conduit means between said third valve and said source of fresh water.

3. A water conservation system comprising: first and second plumbing fixtures of the type wherein water is supplied thereto through an inlet feeding thereinto for use and, after use, is discharged to a drain; conduit means joining the drain of said first fixture to the inlet of said second fixture, whereby used water discharged from said first fixture is channeled to and forms at least a portion of the incoming supply for said second fixture; and fresh water supplying means communicating directly with said conduit means for supplying fresh water to said second fixture by way of said conduit means.

4. The combination of claim 3 including means interposed between said fresh water supplying means and said conduit means for preventing used water from entering said fresh water supplying means.

5. A water conservation system comprising: first and second plumbing fixtures, each fixture being of the type which is normally subjected to engagement by a human body during use and of the type wherein water is supplied thereto through an inlet feeding thereinto for use and, after use, is discharged to a drain associated therewith, conduit means joining the drain of said first fixture to the inlet of said second fixture, said inlet of said second fixture being located at a higher level than the drain of said first fixture; means communicating with said conduit means for forcing water discharged from said first fixture to and out of the inlet of said second fixture, whereby water discharged from said first fixture is adapted to be forcibly channeled to said second fixture to form at least a portion of the incoming supply for said second fixture; and means for supplying fresh water to said second fixture.

6. The combination of claim 5, including means spaced from said first and second fixtures and communicating with said conduit means for receiving and storing water discharged from said first fixture until such water is required by said second fixture.

7. The combination of claim 5 wherein said second fixture is a flush-tank-including toilet and wherein the inlet of said second fixture is located within said flush tank.

8. A water conservation system comprising: first and second plumbing fixtures, said first fixture being of the type which is normally subjected to engagement by a human body during use and of the type wherein fresh water is supplied thereto through an inlet feeding thereinto for use and after use is discharged to a drain associated therewith and said second fixture is a flush-tank-including toilet having a water inlet located in the flush-tank thereof; conduit means joining the drain of said first fixture to the inlet of said second fixture, whereby water discharged from said first fixture is channeled to and forms at least a portion of the incoming water supply for said second fixture; and means spaced from said first and second fixtures and communicating with said conduit means for receiving and storing water discharged from said first fixture until said water is required by said second fixture.

9. The combination of claim 8 including means for supplying fresh water to said second fixture.

References Cited in the file of this patent

UNITED STATES PATENTS

| | | |
|---|---|---|
| 763,178 | Hale | June 21, 1904 |
| 1,143,128 | Mills | June 15, 1915 |
| 1,303,358 | Montgomery | May 13, 1919 |
| 2,858,939 | Corliss | Nov. 4, 1958 |
| 2,877,467 | Cloud | Mar. 17, 1959 |